United States Patent [19]

Noirel et al.

[11] Patent Number: 4,700,184

[45] Date of Patent: * Oct. 13, 1987

[54] ONE-WAY DATA PACKET TRANSMISSION SYSTEM FOR PROCESSING DATA ARRANGED IN GROUPS

[75] Inventors: Yves M. Noirel, Montfort; Jean-Claude Vardo, Montgermont, both of France

[73] Assignee: L'Etat Francais, France

[*] Notice: The portion of the term of this patent subsequent to Nov. 19, 2002 has been disclaimed.

[21] Appl. No.: 435,876

[22] Filed: Oct. 21, 1982

Related U.S. Application Data

[62] Division of Ser. No. 434,531, Oct. 14, 1982, Pat. No. 4,554,660.

[51] Int. Cl.[4] .............................................. H04Q 1/00
[52] U.S. Cl. ............................ 340/825.5; 340/825.14; 370/94
[58] Field of Search .................... 358/86, 142; 370/83, 370/82, 85, 94; 340/825.5, 825.03, 825.14; 364/900

[56] References Cited

U.S. PATENT DOCUMENTS

| | | |
|---|---|---|
| 3,760,371 | 9/1973 | Pitroda et al. . |
| 3,781,818 | 12/1973 | Pardoe et al. . |
| 4,032,972 | 6/1977 | Saylor ................................. 358/142 |
| 4,054,911 | 10/1977 | Fletcher et al. ................. 358/86 X |
| 4,082,922 | 4/1978 | Chu . |
| 4,115,662 | 9/1978 | Guinet el al. ......................... 370/83 |
| 4,120,003 | 10/1978 | Mitchell et al. .................. 358/86 X |
| 4,135,213 | 1/1979 | Wintfeld et al. .................... 358/142 |
| 4,148,066 | 4/1979 | Saylor ............................. 358/142 X |
| 4,554,660 | 11/1985 | Noirel et al. ........................... 370/94 |

FOREIGN PATENT DOCUMENTS

| | | |
|---|---|---|
| 0005317 | 3/1979 | Europian Pat. Off. . |
| 2066024 | 12/1979 | United Kingdom . |

OTHER PUBLICATIONS

IEEE Transaction On Consumer Electronics, Vol. CE-26, No. 3, 8/1980 (A Description of The Broadcast Telidon System).

Videotex Viewdata & Teletext, a transcript of the On Line Conference on Videotext, Viewdata and Teletext, Mar. 1980.

Electronique, "Interface de télé Acquisitions et. de Télécommandes Industrielles Sur Deux Fils", No. 272, Sept. 1979, Paris.

Primary Examiner—Ulysses Weldon
Attorney, Agent, or Firm—Laff, Whitesel, Conte & Saret

[57] ABSTRACT

A field of useful data is split into a number of basic entities, called "data groups". Each data group is, in turn, split into smaller basic entities or "data blocks". Each resulting data block is inserted in a data packet to be transmitted through a teletext or videotext network. Therefore, an input coupler has two functional parts: a data group generator and a data packet generator.

7 Claims, 7 Drawing Figures

ONE-WAY DATA PACKET TRANSMISSION SYSTEM FOR PROCESSING DATA ARRANGED IN GROUPS

This is a division of Ser. No. 434,531, filed Oct. 14, 1982, now U.S. Pat. No. 4,554,660, granted Nov. 14, 1985.

The present invention relates to a one-way data transmission system of the type of the system sold under the trademark DIDON which is actually used by the applicant for broadcasting the teletext service given under the service mark ANTIOPE, for example.

The transmission system using the trademark DIDON is more particularly described in U.S. Pat. Nos. 4,058,830; 4,115,662; 4,317,132 and U.S. patent application Ser. No. 189,080 filed on Sept. 22, 1980 (now U.S. Pat. No. 4,496,975) and Ser. No. 376,790 filed on May 10, 1982 (now U.S. Pat. No. 4,496,975).

In the one-way data transmission system or data broadcasting system described in the above mentioned U.S. patents and patent applications, the transmitted data are arranged in packets, the maximum duration of each packet corresponding to the true duration of one line of a television picture. The packets are inserted, either in the place of the picture signals, or in field fly-back lines, between the typical television line syncronizing signals.

Each transmitted packet starts with a prefix which contains, besides bit and byte, synchronizing signals as well as channel identifiying code signals, a packet format signal indicating the length of the data following said prefix. More specifically, useful data and prefix data are arranged in bytes in any packet. The format signal is thus a byte which indicates the number of useful data bytes following the prefix.

Until now, the transparency of the data transmission system regarding the transmitted digital information was performed at the packet level due to the fact that the use of a format byte allowed, on the one hand, the data flow regulation and, on the other hand, the matching of the DIDON system to the TV standard.

However, the packet level depends on the electrical characteristics of the transmission medium. Instead of insuring the transparency of the data transmission system at that level, the present invention insures the transparency at the level of a new data entity which is a "data group". Such a group level is so chosen that it does not depend on the characteristics of the transmission medium, that allowing to handle entities (the groups) of different sizes, and to accomplish a number of functions, such as:

multiplexing of data of different nature in the same digital channel, the data being intended for a joint use in order to cut to measure the transmission characteristics concerning the conveyance; for example, a number of data groups conveying an information sensitive to transmission errors are systematically repeated;

multiplexing of groups of different nature in the same digital channel, which allows them to switch towards specialized processing organs, at the level of the data receiver;

use of specialized data groups allowing to carry out ciphering processes for the useful data at the level of the conveyance, in order that only a class of subscribers can use such data.

According to one feature of the invention, in a one-way transmission system, the transmitting station transmits digital data from possibly several channels in the form of a packet, each packet having a prefix which contains typical synchronizing signals and channel identifying code signals, with a packet continuity index signal and an information concerning the structure of the packet. Each channel may correspond to a plurality of sources, the data issuing from each source being arranged in data groups formed with a series of data blocks, each data block constituting the data field of a packet, the first block of each group comprising a group header made of bytes which define the type of the group, the group continuity index, the number of blocks in the group which follow the first block and the size of the last block of said group, the prefix of each packet also comprising the information which indicates if the block of the packet is the first block of the group, or not.

According to another feature, the group header includes an information processing category specifying what processing circuit in the data receiver which the group must be applied to.

According to another feature, the header of the first block also comprises an information indicating how many times the involved group will be repeated again.

According to another feature, each data packet comprises, after the useful data field, a number of error detection and correction bytes which form a suffix, and the prefix of each packet comprises an information indicating the number of bytes forming the suffix.

The above mentioned and other features of the present invention will appear more clearly from the following description of an embodiment, said description being made in conjunction with the accompanying drawings wherein.

Figure 1:
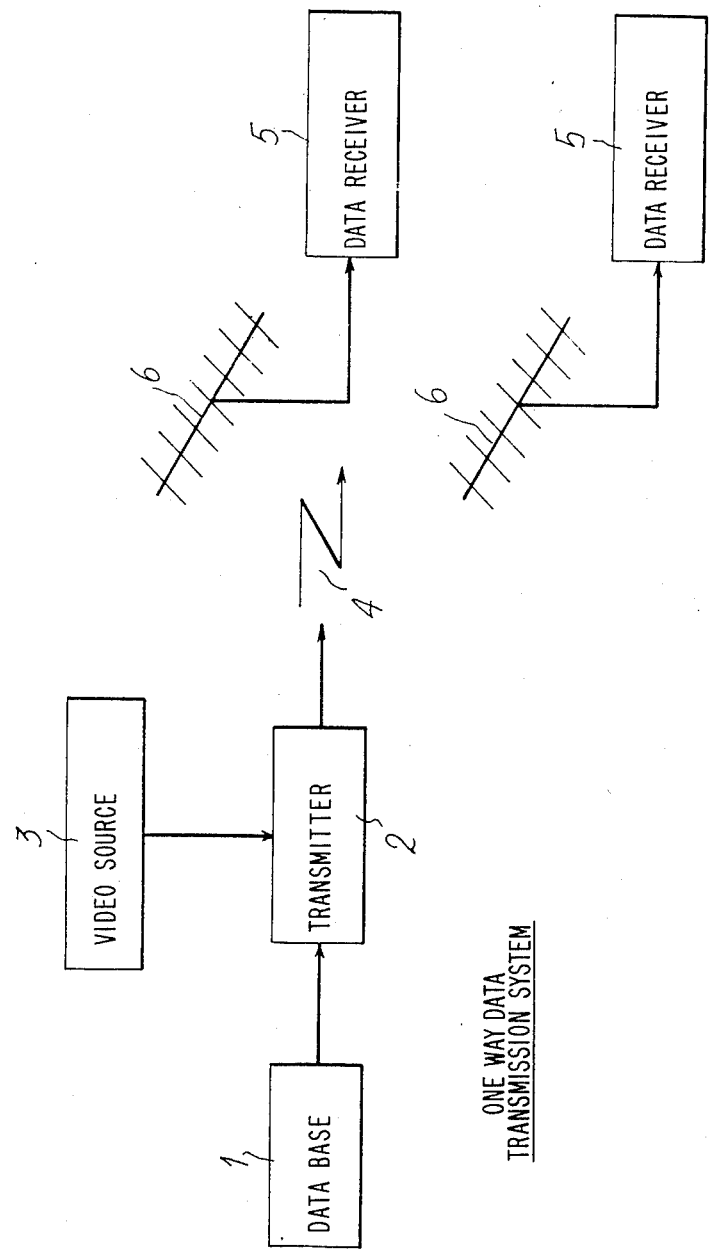
FIG. 1 is a block-diagram of a one-way data transmission system of the type sold under the trademark DIDON.

In the described embodiment, consideration will be particularly given to the broadcasting of a data bank file by means of the system associated with the trademark DIDON, those data possibly being bank data. Referring to FIG. 1, the data bank transmission system comprises a data base 1, a transmission equipment 2 of the type sold under the trademark DIDON which can also transmit video programs from a source 3, a TV broadcast network 4, and a plurality of data receivers 5 with a receiving antenna 6, a subassembly 7 (FIG. 5) for demodulating the video signals, a data acquisition device 8 and dialogue peripheral 9 in each receiver.

The purpose of the transmission equipment 2 (FIG. 1) is to adapt the information supplied by the data bank to the DIDON network which has to transmit it. Two other functions are assigned to the transmission equipment 2:

it has to generate an access message information to code the data at the level of conveyance;

it has to generate a real-time data and hour information for resynchronizing the clocks of the data receivers 5.

Figure 2:
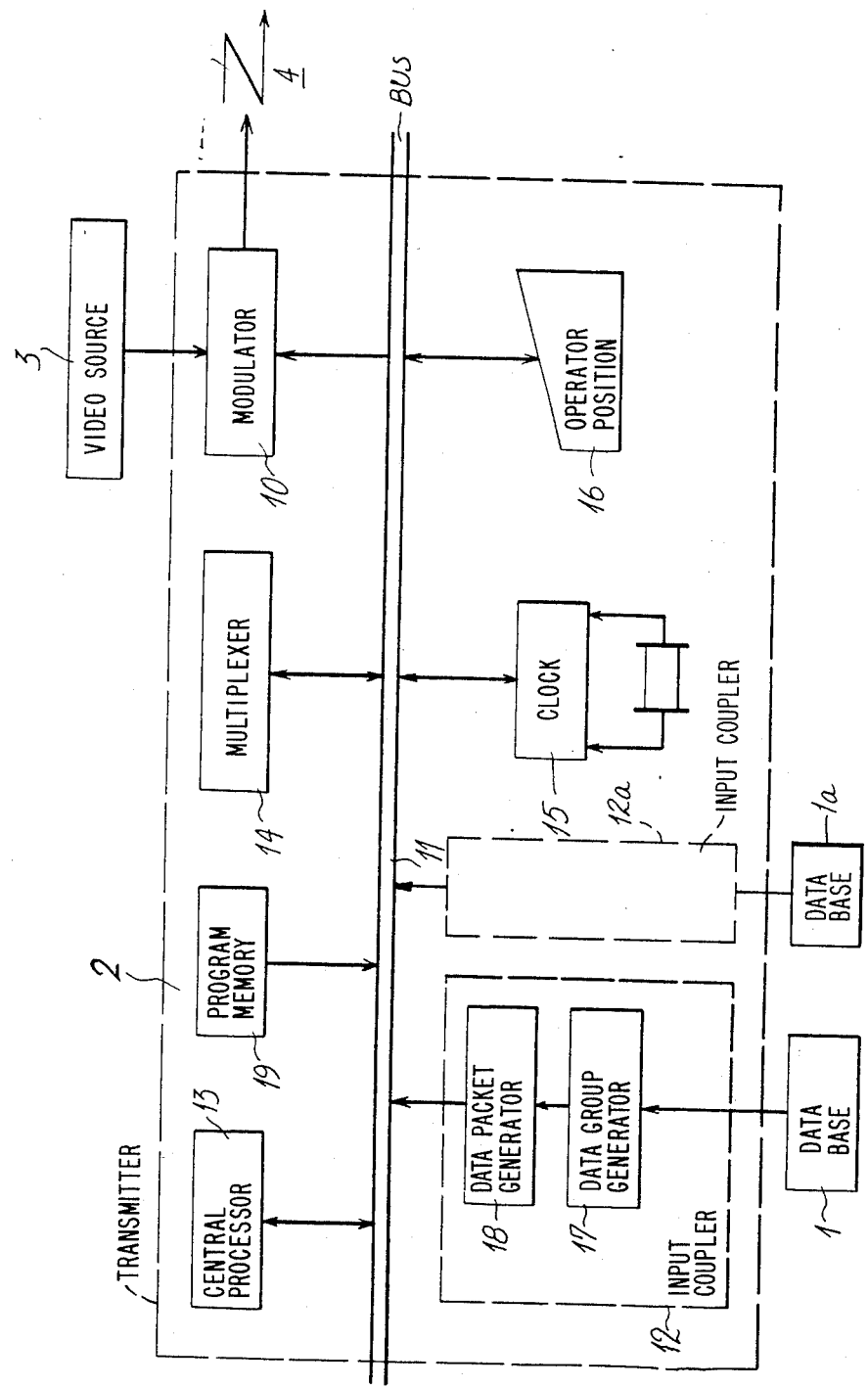
FIG. 2 is a block-diagram of the transmission system according to the invention used in the system of the FIG. 1.

The transmission equipment, shown in FIG. 2, is a communication node, the input of which receives the output signals from any data source, such as the data base 1. The output of data base 1 applies its output signals to a host network through a modulator 10, such a host network being, for example, a TV broadcast network 4, which broadcasts data according to the DIDON standard, modified according to this invention. Video signals from source 3 may also be applied to modulator 10.

The items forming the transmission equipment are interconnected by a standardized DATA bus BUS and include a plurality of interfaces: input couplers 12, central processor 13, multiplexing circuit 14, modulator 10, digital clock 15, operator 16 and program memory 19. In the described embodiment, it is assumed that the transmission equipment 2 has only one input coupler 12 which connects it to the data base 1 although a second coupler 12a is shown in FIG. 12 merely to indicate that a plurality of couplers may be used. Couplers 12 and 12a are identical.

At the level of this specialized input coupler, performed are the management or control of the information entities called "data groups", comprising the above mentioned hour-date groups, access message groups, file groups, as well as the processing of the data at the level of the DIDON network. The structure and operation of input coupler 12 will be described hereafter. It should be noted that the DATA exchanges are made packet by packet from input coupler 12 to multiplexing circuit 14.

Central processor 13 handles the connection with operator 16, manages or controls the scanning of input couplers 12, when there are several input couplers, and indicates to multiplexing circuit 14 where the data packets are to be transmitted. Finally, central processor 13 provides the synchronization for the whole system, when the system is being initialized.

Multiplexing circuit 14 is assigned to collect the data packets formed in input couplers 12 in order to transmit them. Thus, multiplexing circuit 14 is a non-intelligent item with a simple memory organized in pages, one page containing a DIDON packet, a direct access system from the input couplers to the page memory, and a circuit for monitoring the transmission window, i.e. the video lines reserved to the data broadcasting.

Modulator 10 shapes the data and inserts them in the video signal in the TV lines, corresponding to the transmission window.

Digital clock 15, embodied on a card called "clock card", supplies real-time hour and date information, the corresponding data groups being generated in central processor 14.

Operator position 16 allows the transmission equipment to be configured (i.e. switching on, general initialization, hour and date synchronization, and so on).

Figure 3:
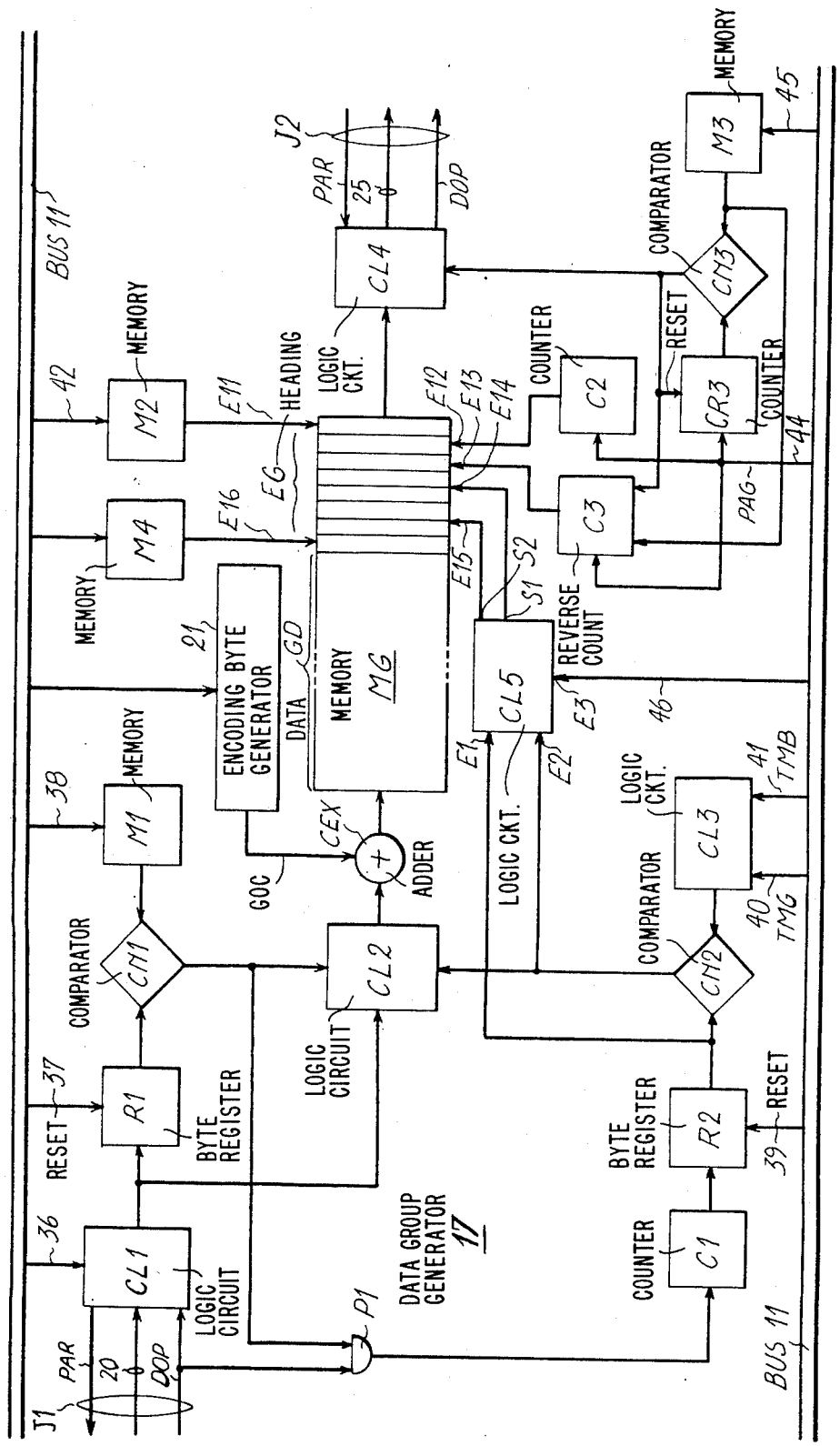
FIG. 3 is a block-diagram of the logic part of the subassembly for processing the data groups, in the equipment of FIG. 2.

According to this invention, the field of useful data from data source 1 is split into a number of basic entities called "data groups". In turn, each data group is split into smaller basic entities, called "data blocks". Each resulting data block is inserted in a data packet to be transmitted through the DIDON network. Therefore, input coupler 12 has functional parts: a data group generator 17, shown in FIG. 3, and a data packet generator 18, shown in FIG. 4.

In the data group generator 17 (FIG. 3), data from source 1 are transmitted through a junction J1 of the type described in the published French Pat. No. 2,268,308. Junction J1 has eight wires 20 for parallel transmitting the bytes, a wire DOP whose level is controlled by source 1 for indicating either the presence or the absence of data, and a wire PAR whose level is controlled by input coupler 12 for indicating whether or not input coupler 12 is ready to receive data. Junction J1 is connected to the input of a logic circuit CL1 whose output is connected to a second logic circuit CL2, on the one hand, and a byte register R1, on the other hand. A control input of circuit CL1 is connected from the BUS 11 through a connection 36 that is used for transmitting an on/off order from operator position 16 (FIG. 2).

Wire DOP is used for transmitting a change of condition for each byte transmitted from source 1, is connected to one input of an AND gate P1 whose output is connected to the input of a counter C1. The output of register R1 is connected to the first input of a digital comparator CN1, whose second input is connected from the output of a memory M1 which contains a binary encoded identity byte corresponding to the start of the file transmitted from data base 1. The output of comparator CN1 is connected to the other input of AND gate P1, on the one hand, and a control input of logic circuit CL2, on the other hand. As soon as the encoded identity stored in memory M1 is recognized in the data flow transmitted from logic circuit CL1, comparator CN1 delivers a signal which triggers logic circuit CL2 and turns on AND gate P1. The register R1 is connected to the BUS 11 through a connection 37 that is used for transmitting a reset order. Memory M1 is connected to the BUS 11 through a connection 38 that is used by central processor 13 for eventually changing the contents of memory M1.

The output of logic circuit CL2 is connected to an input of an adder (modulo-2) CEX whose output is connected to the input of a memory MG. The output of counter C1 is connected to a byte register R2 which thus includes the number of bytes transmitted from logic circuit CL2 to memory MG. The reset input of register R2 is connected from the BUS 11 through a connection 39 and its output is connected to the first input of a digital comparator CN2. The second input of comparator CN2 is connected from the output of a logic circuit CL3 which stores the maximum number of useful bytes in a data group. Logic circuit CL3 computes the number of bytes of a group from the information TMG or "maximum group size" and the information TMB or "maximum data block size", which are respectively transmitted from the BUS 11 through connections 40 and 41. The output of comparator CN2 is connected to a halt control input of logic circuit CL2, on the one hand, and an input of another logic circuit CL5, on the other hand. Another input of logic circuit CL5 is connected from the output of register R2. When the contents of R2 corresponds to the contents of logic circuit CL3, comparator CN2 turns logic circuit CL2 off, inhibiting the entry of data in memory MG.

Memory MG has two parts: one part EG wherein the group header bytes are stored and another part GD wherein data bytes from the data source are stored through logic circuits CL1 and CL2. Memory part EG has six inputs E11–E16.

Input E11 is connected to the output of a memory M2 which contains a byte TG said "data group type byte". Memory M2 is connected to the BUS 11 through a connection 42 which is used by the processor for changing the contents of memory M2.

The byte TG indicates the particular class of the processing which must be performed by the data receiver. In the described embodiment, there are four types of data groups. First groups formed by the central processor 13 relate to the real-time hour-date information, and constitute the hour-date groups. Second data groups also formed by the central processor 13 relate to an access message information which encode the information contained in the files. Third and fourth data groups are relating to file data, encoded or not. The information supplied by the byte TG defines groups of different characters on the same digital channel, the groups being directed toward specialized processing devices or organs, in the receiver (hour and date processing devices or organ, message information processing devices or organ, file information processing devices or organ). In the described embodiment, the data transmitted by the source 1 and stored in the memory MG are assumed to be encoded. The adder or exclusive-OR circuit CEX is provided to this end, and has a second input GOC which is connected to an encoding byte generator 21. The encoding process is not a part of the present invention and is described, for example, in the published French Patent Application No. 2,448,825.

Input E12 is connected to the output of a counter C2 of which the contents is a byte C or "data group continuity index byte". The byte C enables a sequencing of the data groups of a same type TG. The continuity index varies from 0 to 15 and is incremented by 1 (modulo 16) at each transmission of a data group of the same type TG. The signal input of the counter C2 is connected to the BUS 11 through a connection 44 which is used by processor 13 (FIG. 2) for the transmission of a signal PAG for each transmission order.

Counter C2 is incremented for each transmission order of a group PAG, transmitted through the connection 44. The output of counter C2 is connected to input E12 which receives the group number, i.e. the byte C.

Output of a connector CR3 is connected to the first input of a comparator CN3, the signal input of counter CR3 being connected from a connection 44. The second input of comparator CN3 is connected from the output of a memory M3 and its output is connected to both the control input of a logic circuit CL4 and the reset input of the counter CR3. When the contents of the counter CR3 corresponds to the contents of memory M3, the comparator CN3 supplies a signal which turns off the logic circuit CL4 and resets the counter CR3. The memory M3 is connected to the BUS 11 through a connection 45 which is used for changing the contents of memory M3.

The connection 44 is also connected to the signal input of a reversible counter C3 of which the initialization input is connected to the output of the comparator CN3. For each transmission of a repeated group, the contents of the reversible counter C3 is decremented and forms the "data group repetition index", or byte R. The output of the reversible counter C3 is connected to the input E13 of the part EG of memory MG.

Practically, the repetition index R indicates the number of the remaining data group retransmissions. By using such an index, it is possible to repeat an information which is sensitive to transmission errors. For example, in the described embodiment, the access message information is transmitted in a group which is repeated two times; i.e. transmitted three times. The message information is thus protected from any transmission error which otherwise may be the cause of the loss of the data file, which is rendered unintelligible. Therefore, the byte R allows the characteristics of the transmission to be adjusted at the level of the conveyance, with respect to the desired quality of the transmission, expressed as a residual error rate, to the sensitivity of some useful information and the propagation conditions of the signal.

Input E14 is connected from the output S1 of a logic circuit CL5 which has an input E1 connected from the output of the register R2 and another input E2 connected from the output of comparator CN2. From the information supplied by byte register R2 and comparator CN2, the logic circuit CL5 delivers at its output S1 a signal which comprises two bytes T1 and T2 and indicates the "data group size". The signals T1, T2 indicates the number of the following data blocks in the data group and may have a value from 0 to 225. It is thus possible to cut to measure the length of the data groups according to the nature of the data to be transmitted. For example, in the described embodiment, the value of the signals T1, T2 is equal to 0 for the hour-date groups, since the group header and the useful hour and date information correspond to only a single packet. On the contrary, the file information groups have a maximum size of eleven data blocks.

Input E15 is connected to the output S2 of circuit CL5 which supplies a signal comprising two bytes F1 and F2 and indicating the "size of the last block of the data group", i.e. the number of information bytes in the last data block of the data group. For example, the field of the useful data in a message information is 46 bytes. Therefore, the corresponding group comprises two data blocks, which correspond to a group size T1, T2 which is equal to 1. Since the maximum length of the data blocks is 30 bytes and the group header corresponds to 8 bytes, the second transmitted block is not full. The size of the last and second block given by F1, F2 is, therefore, 24 bytes.

Input E16 is connected from output of memory M4 wherein byte N, i.e. the "data group routing information", is stored. The byte N is controlled by the broadcaster and indicates the routing through the transmission network for the concerned data group. The byte N may have a value from 0 to 15 which makes it possible to monitor functions such as the passage through timing stations taking time-zones into consideration. Typically, such an information is not utilized in the data receivers, but in relay stations. Indeed, the use of the routing byte will not be hereby described.

Input E3 of logic circuit CL5 is connected from the BUS 11 through a connection 46 which is used by logic circuit CL5 for receiving the information relating to the maximum packet size from processor 13.

The data input of logic circuit CL4 is connected from the read output of memory MG. The output of logic circuit CL4 is connection to a junction J2, the structure of which is identical to junction J1. Junction J2 is comprised of eight wires 25 for parallel transmitting bytes, a wire PAR and a wire DOP.

When receiving a group transmission signal PAG through connection 44, simultaneously with a reset signal through connection 43, counter R3 is reset. Therefore, the output of comparator CN3 is turned to a high level and logic circuit CL4 is turned on. The contents of memory MG is then read by logic circuit CL4 which transmits such contents to junction J2 in accordance with the known protocol resulting from signals PAR and DOP. After the group has been repeated the desired number of times, counter CR3 reaches the count stored in memory M3 and the output of comparator CN3 is turned to low level, logic circuit CL4 being thus turned off. After the group has been repeated the last time, processor 13 (FIG. 2) applies a reset signal to both registers R1 and R2, through connections 37 and 39, respectively. Then processor 13 applies an operation order to logic circuit CL1 through 36, which allows the formation of the next group in memory MG.

Figure 4:
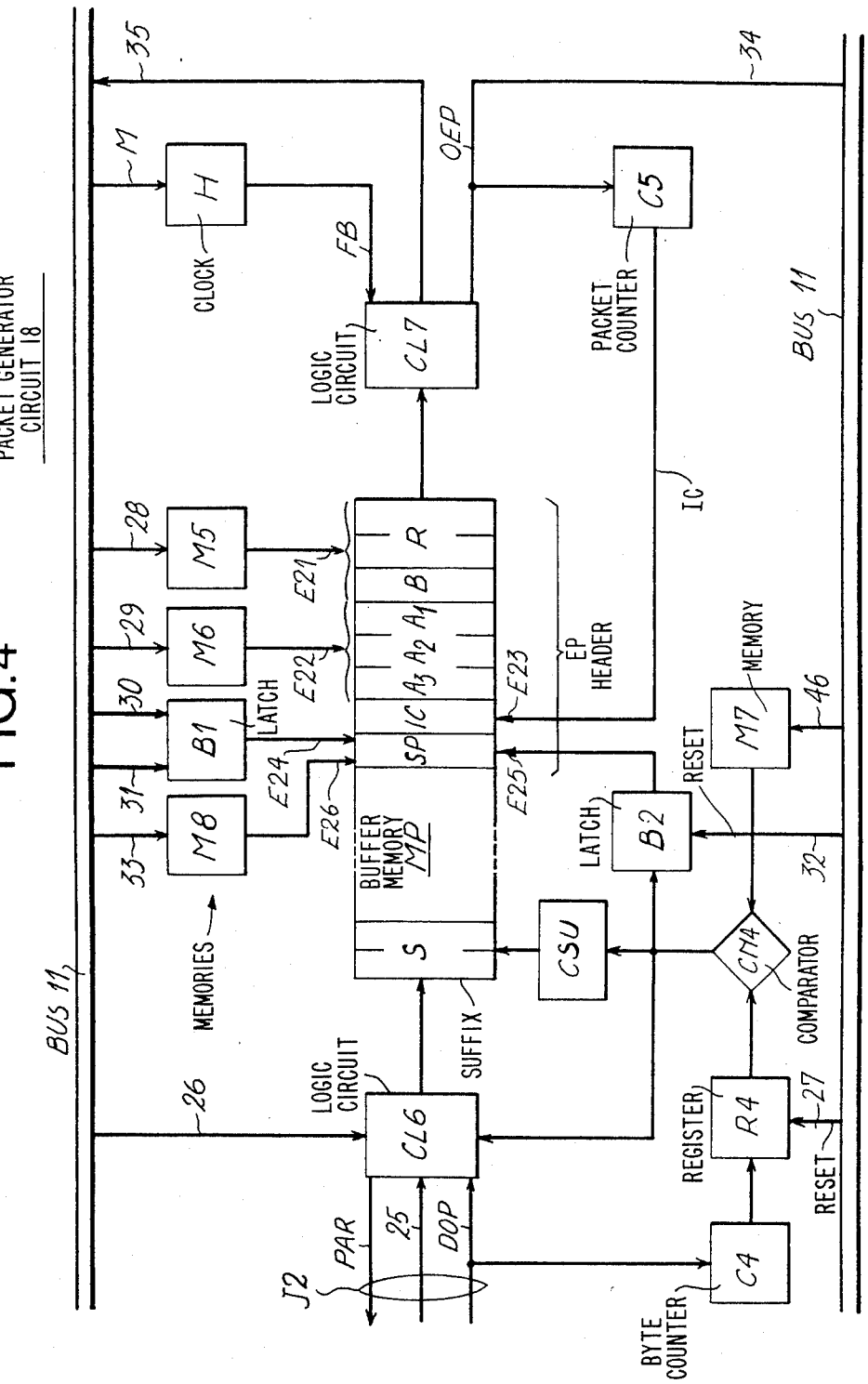
FIG. 4 is the block-diagram of the logic part of the subassembly for generating the data packet, in the equipment of FIG. 2.

Referring now to FIG. 4, in the packet generator circuit 18, junction J2 is connected to the input of a logic circuit CL6 whose output is connected to the write input of a buffer memory MP which can store a data packet. Circuit CL6 is connected to the BUS 11 through the wire 26 that is used by the central processor 13 (FIG. 2) for transmitting an operation order. Wire DOP of junction J2 transmits a condition change for each byte delivered from logic circuit CL4 (FIG. 3), to the input of a byte counter C4 whose output is connected to the input of a register R4 storing the number of bytes transmitted from logic circuit CL6 to buffer memory MP. The reset input RAZ of register R4 is connected to the BUS 11 through a wire 27. The output of register R4 is connected to the first input of a digital comparator CN4.

Buffer memory MP is comprised of three parts EP, BD and S. The first part EP is provided for storing the bytes of the packet header. The second part BD is provided for storing the data bytes received from logic circuit CL6. The third part S is provided for storing the packet suffix bytes which will be described later on.

The part EP has six inputs E21–E26. The first input E21 is connected from output of a memory M5 which stored the bit synchronization signal R, i.e. two bytes R1 and R2, and the byte synchronization signal, i.e. one byte B. Memory M5 is connected to the BUS 11 through a connection 28.

The second input E22 is connected from the output of a memory M6 which stores three Hamming encoded bytes A1, A2 and A3 which form the packet address. Memory M6 is connected to the BUS 11 through a connection 29.

The third input E23 is connected from the output of a packet counter C5 whose input is connected from a connection 34 and output delivers a byte IC indicating the Hamming encoded number of the packet, i.e. the continuity index byte. That continuity index varies from 0 to 15 and is incremented by 1 for each transmission of a data packet on the same digital channel.

The fourth input E24 is connected from the output of a latch B1 whose signal input and reset input are respectively connected to the BUS 11 through the connections 30 and 31. Latch B1 is set to "1" when the block under transmission contains the data group header and reset to "0" in the other cases.

The fifth input E25 is connected from the output of a latch B2 whose signal input is connected from output of a comparator CN4. The first input of comparator CN4 is connected from the output of register R4 which stores the number of the bytes delivered from logic circuit CL6. Its second input is connected from the output of memory M7 which stores the maximum number of data bytes in a data block, for example thirty bytes in the described embodiment. The reset input of latch B2 is connected to the BUS 11 through a connection 32.

The sixth input E26 is connected from the output of a memory M8 whose input is connected to the BUS 11 through a connection 33. Memory M8 stores the size of the suffix located at the end of a packet.

Indeed, inputs E24–E26 receive the information SP regarding the so-called packet structure byte. It is a Hamming encoded byte which makes it possible to distinguish a synchronization packet corresponding to the beginning of a data group from a current packet. Moreover, it makes it possible to know whether or not the packet is full of information bytes. Finally, it defines the size of the suffix used for detecting and/or correcting possible transmission errors in the data block. The following Table 1 gives the meaning of each of the four bits in byte SP.

TABLE 1

| bits | | | | meaning |
| --- | --- | --- | --- | --- |
| b8 | b6 | b4 | b2 | |
| | | | 0 | Standard packet |
| | | | 1 | Synchronizing packet |
| | | 0 | | Packet full of information bytes |
| | | 1 | | Packet not full with bytes |
| 0 | 0 | | | No suffix |
| 0 | 1 | | | 1 byte in the suffix |
| 1 | 0 | | | 2 bytes in the suffix |
| 1 | 1 | | | 3 bytes in the suffix |

The second input of comparator CN4 is connected to the output of a memory M7 which contains the maximum number of useful bytes in a packet, and whose input is connected to the BUS 11 through a connection 46. The output of comparator CN4 is also connected to a control input of logic circuit CL6 which inhibits the latter and, therefore, logic circuit CL4 (FIG. 3) when the number of bytes in register R4 corresponds to the contents of memory M7. But, if it is assumed that the packet is full, the signal will also induce the generation of the suffix bytes. The suffix is calculated by the logic circuit CSU whose activation input is connected to the output of comparator CN4. The output is connected to the input of part S, in memory MP. In the case of the present invention, the suffix is always put at the end of the data packet. The number of suffix bytes defined by the bits b8 and b6 of the packet structure byte reduces in the same proportion as the number of bytes in the data block. In the present embodiment, the suffix has a size of 2 bytes, and the data blocks may contain up to 30 bytes.

The input coupler 12 (FIG. 2) is also provided with a transmission simulator which simulates the dumping of the buffer memory MP, in order to prevent the packets from being broadcasted at too fast a rate, regarding their processing duration in the receiving equipment. Such a simulator is described in the above mentioned U.S. Pat. No. 4,058,830.

The output of memory MP is connected to a transmission logic circuit CL7 whose clock input is connected from the output of a clock H for supplying the bit frequency signal FB and having its initialization input M connected to the BUS 11. The control input of logic circuit CL7 is connected from the BUS 11 through the connection 34 which is used by the central processor 13 for transferring an order OEP, and its output is connected to the BUS through the connection 35. The connection 34 is also connected to the input of the counter C5 which counts the packets transmitted from the input coupler 12 (FIG. 2) to the multiplexing device 14 in accordance with the order OEP from the central processor 13. The packet is transferred byte by byte, from memory MP to multiplexing device 14, through the connection 35 and BUS 11.

The packet is transmitted, bit by bit, from the multiplexing device 14 (FIG. 2) to the modulator 10 which is in charge of shaping the data. Preferably, the modulator 10 is identical to the one described in the above mentioned U.S. Pat. No. 4,058,830.

When the data have been inserted in the video signal, the digital information is broadcasted by the network 4. The broadcasted information is received by a plurality of data receivers 5 (FIG. 5), each of them comprising a receiving antenna 6, a demodulating subassembly 7, a data acquisition device 8 and a dialogue peripheral 9.

Figure 5:
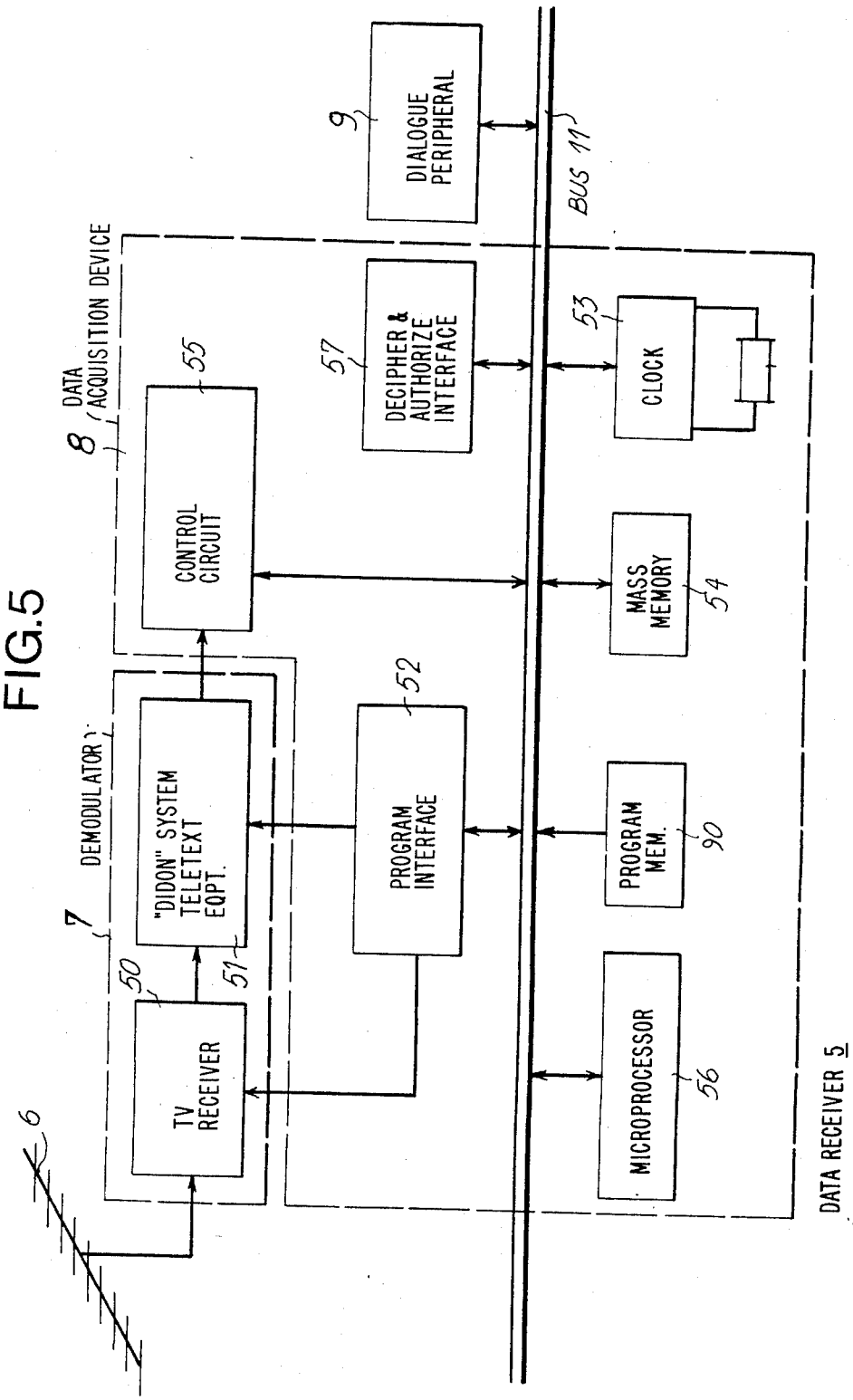
FIG. 5 is the block-diagram of receiving equipment according to the invention.

In the described embodiment, the purposes of the receiving equipment are to acquire the data files and to allow them to be consulted by a peripheral device. FIG. 5 depicts the functional structure of the data receivers 5 which comprise the following means:
- an antenna 6;
- a TV receiving stage 50;
- a subassembly DIDON 51, with a demodulator and a demultiplexing device 50 and 51 constituting the subassembly 7;
- a programming interface 52 for the TV receiving stage and the demultiplexing device DIDON 52;
- a clock circuit 53 for the validity checks of the files;
- a mass memory 54 with a capacity sufficient for containing the totality of the transmitted files;
- a subassembly 55 for processing and managing or controlling the DIDON packets and the data packets;
- a microprocessor 56;
- an EPROM program memory 90, that includes the software of microprocessor 56;
- an interface 57 for the access card which authorizes the decoding of the data;
- a dialogue peripheral 9 consults the files contained in the receiver memory; and
- a bus simply called BUS.

The receiving stage 50 is well known in the art. The operation of DIDON demodulating and demultiplex circuits has been described in the above metioned U.S. Pat. No. 4,058,830. Thus, the structure and the operation of the circuit provided for processing and managing or controlling the data packets and groups will be particularly considered in the following. The subassembly 55 comprises two functional parts:
- the part 58 shown in FIG. 6 provided for the processing of the data packets;
- the part 59 shown in FIG. 7 provided for the processing and the management or control of the data groups.

Figure 6:
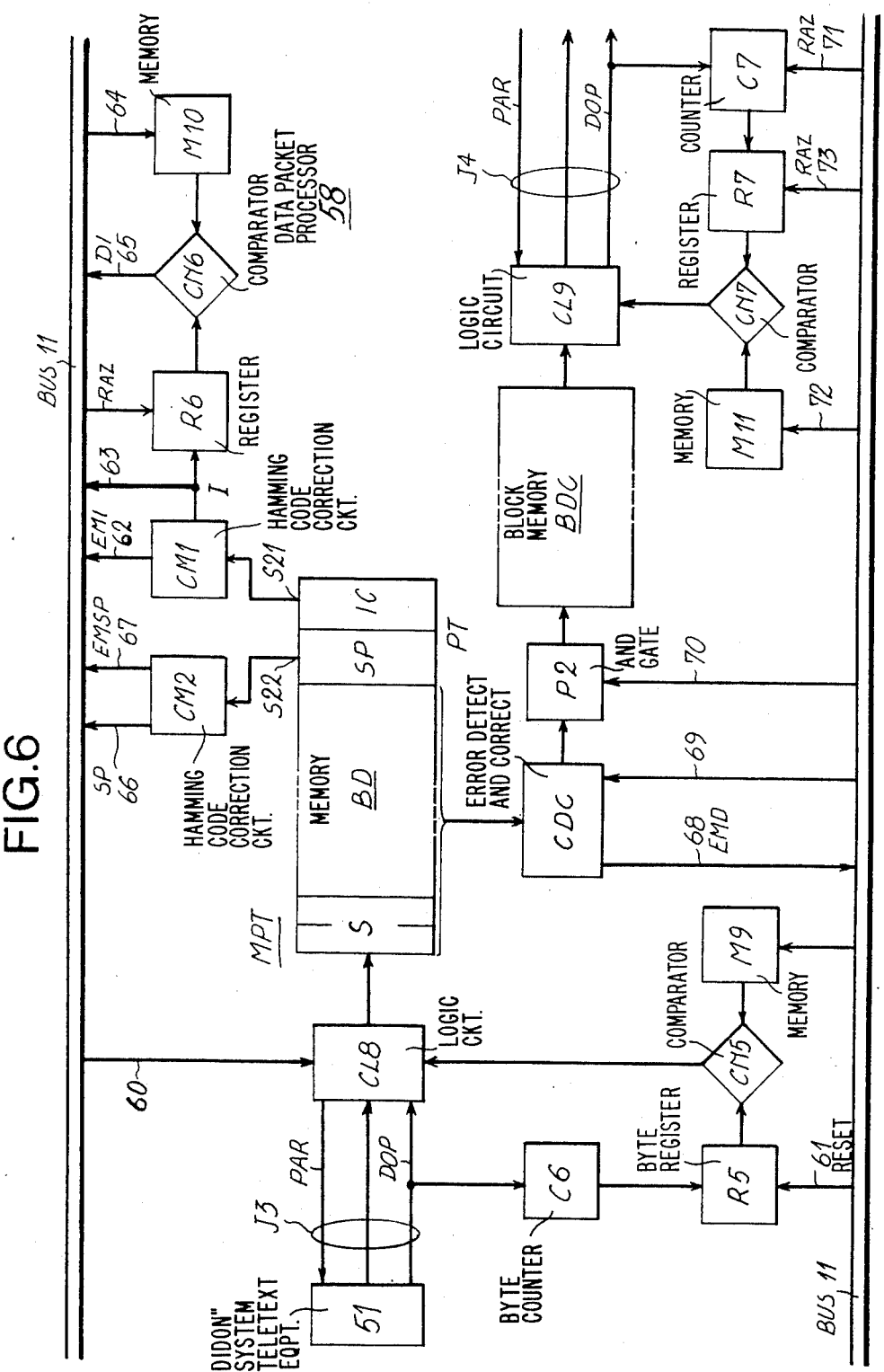
FIG. 6 is a block-diagram of the logic part of the subassembly for processing the data packet in the equipment of FIG. 5.
Figure 7:
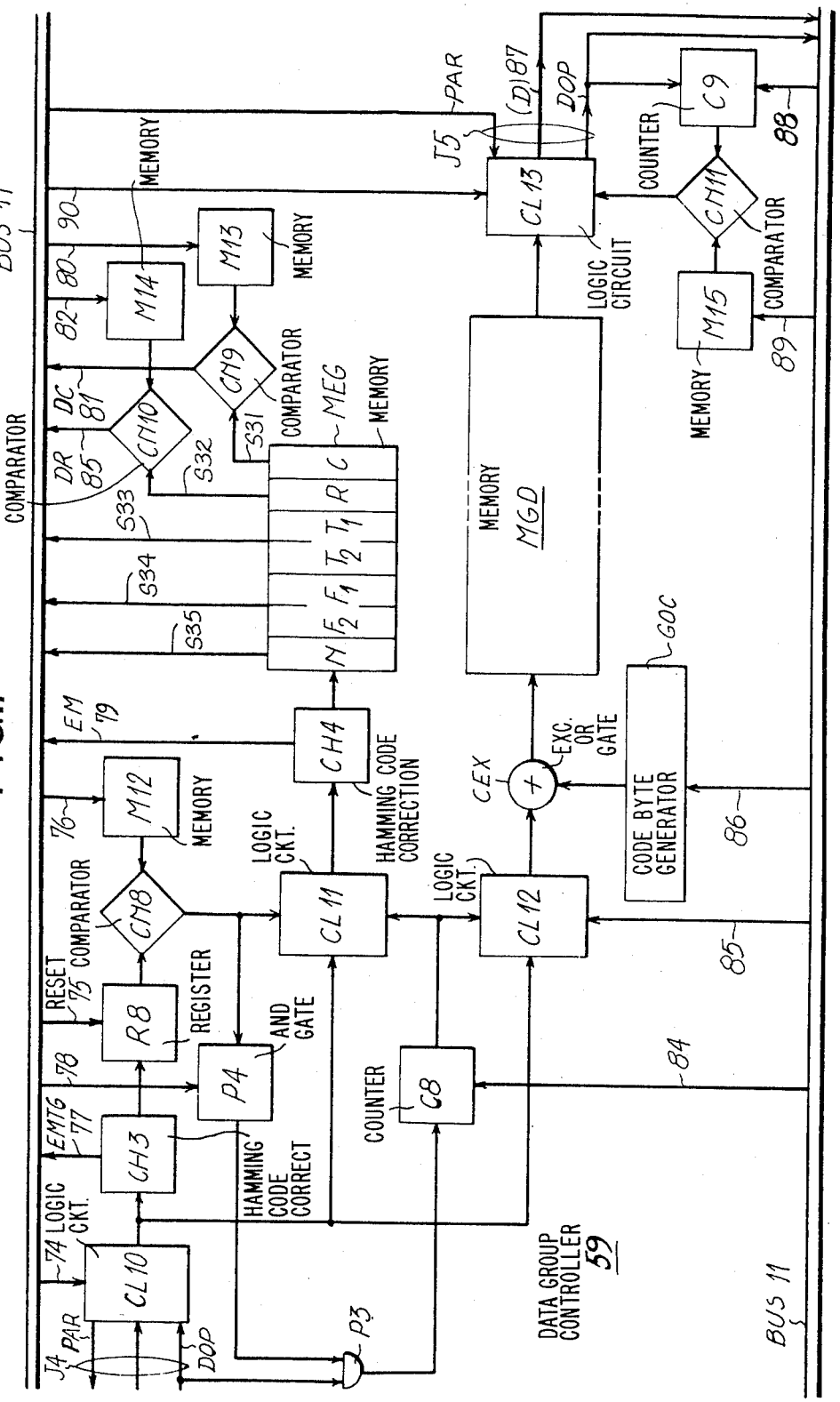
FIG. 7 is a block-diagram of the logic part of the subassembly for processing the data groups, in the equipment of FIG. 5.

The data supplied by the demultiplexing circuit 50 are transferred to the logic circuit CL8 of the FIG. 6, through a digital junction J3, the control input of logic circuit CL8 being connected to the BUS 11 through a connection 60. The output of the circuit CL8 is connected to a memory MPT which can contain a data packet, excluding the bit and byte synchronizing bytes and the three packet address bytes, which corresponds to a memory capacity of 34 bytes in the described embodiment. Wire DOP of the digital junction J3 is connected to the input of a byte counter C6 which has its output connected to the input of a byte register R5, whose reset input is connected to the BUS 11 through the connection 61 which is used by the microprocessor for reinintializing the register each time a data packet is received. The output of the register R5 is connected to the first input of a digital comparator CN5, whose second input is connected to the output of a memory M9, which contains the maximum size of the data packets, i.e. 34 bytes in the present embodiment. The output of the comparator CN5 is connected to the inhibiting input of the circuit CL8. When the contents of the register R5 corresponds to the contents of memory M9, the output signal of the circuit CN5 turns the circuit CL8 off, and the filling of the memory MPT is stopped.

Memory MPT comprises three parts PT, BD and S. Both the continuity index byte IC and the packet structure byte SP are stored in the first part PT. The data block BD are stored in the second part BD. The two suffix bytes S are stored in the third part S. The part PT has a first output S21 connected to a Hamming correction circuit CM1 to which is thus transferred the continuity index byte IC. Depending on the received byte IC, the circuit CM1 supplies the four index information binary digits I, on its first output, and on its second output, a signal EM1 indicating the multiple errors in the index. The first output I of circuit CM1 is connected to the input of a register R6 which thus stores the four useful index bits. The output of register R6 is connected to the first input of a comparator CN6, whose second input is connected to a memory M10 containing the continuity index of the expected packet. The second output EM1 of code correction circuit CM1 is connected from the BUS 11 through a connection 62. The input of the memory M10 is connected from the BUS 11 through a connection 64. The contents of the memory M10 is calculated by the microprocessor 56 (FIG. 5) and transferred through the BUS 11 and the connection 64. The output of the comparator CN6 is connected to the BUS 11 through connection 65. In case the contents of the register R6 does not coincide with the contents of the memory 10, the comparator CN6 supplies a signal D1 indicating a packet index discontinuity to the microprocessor through the BUS 11 and the connection 65. The alarm signal is used by the microprocessor 56 for managing or controlling the data groups.

The part PT of the memory has a second output S22 connected from a second Hamming correction circuit CM2 which supplies the four useful binary digits of the packet structure byte SP, on its first output, and, on its second output, a signal EMSP indicating the presence of multiple errors in the byte SP. The first and second outputs of the circuit CM2 are connected to the BUS 11, through the connections 66 and 67, respectively. The information SP is transmitted to the microprocessor 56 (FIG. 5), via 66 and the BUS 11, and contains in particular the bit b2 indicating if it is or not a synchronizing packet.

The read output of the parts BD and S of the memory MPT is connected to the input of a circuit CDC which is able to detect and correct the errors in the data block. A control output of the circuit CDC is connected to the BUS 11 through a connection 68 and a data output of circuit CDC is connected to one input of an AND gate P2. A control input of the circuit CDC is connected from the BUS 11 through a connection 69. The other input of the AND gate P2 is connected from the BUS 11 through a connection 70. The output of the AND gate P2 is connected to the input of a block memory BDC.

As long as a packet of the synchronizing type, with b2=1, is not found in the flow of packets transmitted by logic circuit CL8, the microprocessor does not receive the corresponding information through 66 and does not turn the AND gate P2 on, via connection 70. The memory BDC cannot be filled and it is insured that the first block transmitted to memory BDC is a block corresponding to a synchronizing packet.

Furthermore, the bytes stored in the second part BD and the third part 5 of the memory MPT are read and processed in the circuit CDC. The multiple error information EMD in the data block is transferred through conductor 68 and used by the microprocessor 56 (FIG. 5) for processing the data groups. When any eventual errors have been corrected by the error detection and correction circuit CDC, the data block bytes are stored in the block memory BDC.

The capacity of the memory BDC is such that the memory can contain a data block, i.e. 30 bytes in the described embodiment. Through the connection 69, the circuit CDC receives a signal from the microprocessor 56 (FIG. 5) which indicates the size of the data blocks which must be transferred in the memory BDC.

The output of the memory BDC is connected to the input of a logic circuit CL9 whose output is connected to a junction J4. As soon as the memory BDC is filled, the logic circuit CL9 transfers the data, byte by byte, to the data group processing subassembly, through the junction J4. The exchanges are made by means of the signals PAR and DOP. The wire DOP of the junction J4 is connected to the input of a counter C7 whose reset input is connected to the BUS 11 through a connection 71 and the output is connected to the input of a register R7. Each time a byte is transmitted, the counter C7 is incremented and its contents are transferred to the byte register R7. The output of the register R7 is connected to a first input of a digital comparator CN7 whose second input is connected from the BUS 11 through a connection 72. The reset input of the register R7 is connected from the BUS 11 through a connection 73. The output of the comparator CN7 is connected to the inhibiting input of the circuit CL9.

When the contents of register R7 coincide with the contents of memory M11, the comparator CN7 supplies a signal which turns off the circuit CL9, and the data cannot be transferred to the group processing subassembly through junction J4.

Junction J4 is connected to a logic circuit CL10 in the functional part 59 shown in FIG. 7. Logic circuit CL10 is connected to the BUS 11 through a connection 74 which is used by the microprocessor 56 (FIG. 5) for transmitting an enabling order. The output of circuit CL10 is connected to the input of a Hamming correction circuit CH3, the input of a logic circuit CL11 and the input of a logic circuit CL12. An output of Hamming correction circuit CH3 is connected to the input of a register R8 for delivering to the register R8 the four useful bits b2, b4, b6 and b8 of the first byte of the first data block. The output of register R8 is connected to the first input of a digital comparator CN8 whose second input is connected from the output of a memory M12 storing the group type information TG. Reset input of register R8 is connected from the BUS 11 through a connection 75 and input of memory M12 is connected to the BUS 11 through a connection 76. A second output of Hamming correction circuit CH3 is connected to the BUS 11 through a connection 77. The output of comparator CN8 is connected to the enable input of a logic circuit CL11 and one input of an AND gate P4. The output of AND gate P4 is connected to one input of an AND gate P3 whose other input is connected from the wire DOP of junction J4 and the output is connected to the input of a counter C8. The output of counter C8 is connected to the inhibition input of logic circuit C11, on the one hand, and activation input of logic circuit C12, on the other hand.

It will be assumed that the group carries the data of an encoded file. As soon as the expected type TG has been recognized, comparator CN8 delivers a signal that turns on logic circuit CL11. As a result, logic circuit CL11 receives the data delivered from circuit CL10, starting from the second byte of the first data block.

The second input of AND gate P4 is connected from the BUS 11 through a connection 78 which is currently activated. When the output of logic circuit CL8 (FIG. 6) is turned to a high level, the output of AND gate P4 activates an input of AND gate P3 which is thus turned on for the signals DOP of junction J4.

The output of AND gate P3 is connected to the byte counter C8 which turns off logic circuit CL11 when its count reaches the value "9". Therefore, logic circuit CL11 is receiving bytes 2-8 of the group header contained in the first data block. The output of logic circuit CL11 is connected to a Hamming correction circuit CH4 whose output is connected to the input of a memory MEG. Hamming correction circuit CH4 which delivers the useful information bits to memory MEG. A second output of Hamming correction circuit CH4 is connected to the BUS 11 through a connection 79, in order to indicate to microprocessor 56 (FIG. 5) the multiple errors EM in each of the group header bytes. The first information stored in memory MEG is the group continuity index C. Memory MEG has five outputs S31–S35 for delivering the information C, R, T1 and T2, F1 and F2, and N. Output S31 is connected to the first input of a digital comparator CN9 whose second output is connected from the output of a memory M13 storing the expected continuity index. The input of memory M13 is connected from the BUS 11 through a connection 80, and the output of comparator C9 is connected to the BUS 11 through a connection 81. The value of the index C received from memory MEG is compared with contents of memory M13. In case of no coincidence of the two values, comparator CN9 delivers an index discontinuity signal to microprocessor 56 (FIG. 5) through connection 81.

Second input S32 of memory MEG is connected to the first input of a digital comparator CN10 whose second input is connected from the output of a memory M14 whose input is connected from the BUS 11 via the connection 82. The output of comparator CN10 is connected to the BUS 11 via a connection 83. Information delivered from connection S32 is the group repetition index R. Comparator CN10 compares the value of information R received over conductor S32 with the value stored in memory M14. If the values are not coincident, comparator CN10 delivers a signal indicating a discontinuity in the progression of the repetition index to microprocessor 56 (FIG. 5).

In a same manner, counter C8 turns on logic circuit CL12 when its count reaches the value "9", such that data of data blocks can be transferred through logic circuit CL12, excluding the group header data. The reset input of counter C8 is connected from the BUS 11 through a connection 84. The inhibition input of logic circuit CL12 is connected from the BUS 11 through a connection 85. The output of logic circuit CL12 is connected to one input of an exclusive-OR gate CEX whose second input is connected from the output of a coding byte generator GOC whose input is connected from the BUS 11 through a connection 86. The output of exclusive-OR gate CEX is connected to the input of a memory MGD.

An assumption has been made that the data had been encoded. Information supplied from a logic circuit CL12 is transferred through an exclusive-OR gate CEX connected from the generator GOC, said exclusive-OR gate performing the decoding of the data. When decoded, the cleared data are transferred to the memory MGD. The filling of memory MGD is stopped by a signal delivered from microprocessor 56 (FIG. 5), through the BUS 11 and connection 85, the signal turning off logic circuit CL12. This signal is generated by microprocessor 56 (FIG. 5) from information stored in memory MEG, i.e. the "group size" and the "size of the last data block". In case the data group is repeated, and if the previously stored blocks are considered as being affected by errors which cannot be corrected, the contents of the corresponding locations in the memory are replaced by the data of the repeated block provided that the block is not affected by errors which cannot be corrected. Such a processing is performed by degrees until the repeated blocks are exhausted.

The output of memory MGD is connected to the input of a logic circuit CL13 whose output is connected to a junction J5, the wires PAR, DOP and the data transmission wire 87 of the junction being connected to the BUS 11. Furthermore, the wire DOP is connected to the input of a counter C9 whose reset input is connected to the BUS 11 through a connection 88. The output of counter C9 is connected to the first input of a comparator CN11 whose second input is connected from the output of a memory M15 whose input is connected from the BUS 11 through a connection 89. The memory M15 contains the size of the data group. The output of comparator CN11 is connected to the inhibiting input of the circuit CL13. The enable input of the circuit CL13 is connected from the BUS 11 through a connection 90.

When the filling of the group data memory MGD is achieved, the microprocessor 56 (FIG. 5) transfers the data to the memory RAM of the receiver, through the circuit CL13, connection 87 and the BUS 11. At the end of the transmission, the memory thus contains the totality of files transmitted from the data base, and the files may be consulted by the dialogue peripheral 9 (FIG. 5).

It must be well understood that the system which has been described may be modified without departing from the scope of the invention.

The system may be used with any one-way system for allowing a standard video signal transmission, such as a wire program distribution network, for example, in place of an aerial TV channel.

The system according to the invention may also be used with a one-way medium intended for transmitting data packets, whatever be the temporal structural supplied by the synchronizing signals of the video signals, for example, on a carrier modulated for supplying a digital flow.

Those who are skilled in the art will readily perceive how to modify the invention. Therefore, the appended claims are to be construed to cover all equivalent structures which fall within the true scope and spirit of the invention.

What is claimed is:

1. A process for one-way data transmission system comprising:
   deriving data from a plurality of data sources, for transmitting digital data from said sources over a plurality of channels in a multi-channel transmission system, said data being in the form of data packets, each packet comprising a prefix including a packet continuity index signal (IC) and a packet structure information signal, synchronizing signals (R1, R2, B) and a channel identifying code signal (A1, A2, A3), each of said channels being coupled to carry data from any or all of said plurality of sources;
   transmitting the data from each of said sources while arranged in data groups comprising a series of data blocks, each data block forming the data field of a packet;
   the first block of each group comprising a group header with bytes defining the type of the group (IG), a group continuity index (C), the number of the blocks which follow the first block in the group (T1, T2), and the size of the last block of the group (F2, F2);
   the prefix of each packet additionally comprising the information (B1) indicating whether or not the block of the packet is the first block of a group; and
   multiplexing the blocks belonging to a group from one channel without multiplexing together blocks belonging to different groups from the same channel.

2. The one-way data transmission process according to claim 1, wherein the group header includes a processing category information signal (TG) for selecting a processing circuit in a receiver to which the data group containing said header is to be applied.

3. The one-way data transmission process according to claim 1 and the added step of repeating data groups, and indicating an information (R) signal in the group header for indicating how many times the data group will be repeated.

4. The one-way data transmission process according to claim 2 and the added step of repeating data groups, and including an information (R) signal in the group header for indicating how many times the data group will be repeated.

5. The one-way data transmission process according to claim 1 wherein each data block includes the useful data, followed by a number of error detection and correction bytes forming a suffix, and wherein the prefix of each packet includes an information signal (S) for indicaing the number of bytes forming said suffix.

6. The one-way data transmission process according to claim 2 wherein each data block includes the useful data, followed by a number of error detection and correction bytes forming a suffix, and wherein the prefix of each packet includes an information signal (S) for indicating the number of bytes forming said suffix.

7. The one-way data transmission process according to claim 3 wherein each data block includes the useful data, followed by a number of error detection and correction bytes forming a suffix, and wherein the prefix of each packet includes an information signal (S) for indicating the number of bytes forming said suffix.

* * * * *